United States Patent [19]

Croft

[11] Patent Number: 5,057,467

[45] Date of Patent: Oct. 15, 1991

[54] PROCESSING ADDITIVES FOR CLAY PRODUCTION

[75] Inventor: Alan P. Croft, Lake Jackson, Tex.

[73] Assignee: The Dow Chemical Company, Midland, Mich.

[21] Appl. No.: 433,630

[22] Filed: Nov. 8, 1989

[51] Int. Cl.$^5$ .............................................. C04B 33/04
[52] U.S. Cl. .................................... 501/148; 106/486; 106/487
[58] Field of Search ............... 501/141, 145, 146, 148; 106/486, 487

[56] References Cited

U.S. PATENT DOCUMENTS

| | | | |
|---|---|---|---|
| 2,768,089 | 10/1956 | Erickson | 106/287 |
| 4,076,548 | 2/1978 | Bundy et al. | 106/288 B |
| 4,106,949 | 8/1978 | Malden | 106/288 B |
| 4,227,920 | 10/1980 | Chapman et al. | 75/1 R |
| 4,929,580 | 5/1990 | Jones | 501/148 |

*Primary Examiner*—Karl Group
*Assistant Examiner*—Paul Marcantoni

[57] ABSTRACT

The filtration rate and viscosity of a clay slurry is improved by the addition of a polyalkylene polyamine and, optionally, a latex. The additive is particularly useful in clay beneficiation.

18 Claims, No Drawings

PROCESSING ADDITIVES FOR CLAY PRODUCTION

BACKGROUND OF THE INVENTION

The present invention relates to a method of improving the ability to filter a clay slurry.

Clay materials are earth materials composed mainly of hydrated aluminum silicates. Various types of clay exist such as kaolinite, montmorillonite, attapulgite, bentonite, illite and ball clay.

Kaolinite or kaolin clay, for example, is a large volume raw material that is used in a number of applications. The largest single use of the material is in the production of glazed paper stocks. The incorporation of the clay into the paper results in a superior product which is used primarily for book and magazine production. A minor application for kaolin is as a raw material in certain ceramic systems. Other minor applications also exist.

Clays occur in scattered deposits worldwide. This naturally occurring material is mined, then undergoes further processing before use. In a typical kaolin mining operation, for example, the kaolin seam is uncovered by removing any overburden by mechanical means. Then the clay itself is removed, often by use of high pressure water streams directed against the clay deposit. Thus, a dilute suspension of the unrefined clay is collected and treated in order to yield the clay of commerce. Treatment of the raw clay is known as beneficiation. In a typical process, the raw kaolin slurry (about 25 percent solids) is treated with sulfuric acid and alum in order to flocculate the clay particles. The flocculated clay suspension is dewatered by filtering using rotary vacuum filters. The filter cake must then be re-suspended in water using polyacrylate dispersants and soda ash to yield a high solids slurry (60–70 percent solids), which is then sold. Alternately, the filter cake is dried and air floated to yield a fine dry powder which is also sold.

Currently, the bottleneck in the processes for obtaining clay is the filtration operation. This operation is both costly and time-consuming, but is necessary in order to produce a clay that possesses stable viscosity and color properties. Kaolin clays without these key properties are unacceptable in most applications. In order to increase productivity and lower costs to the producer, methods to facilitate this filtration are needed. Techniques for increasing throughput or lowering energy consumption during the filtering step would result in significant benefits for kaolin producers.

Other problems exist in the current beneficiation process. For example, the acids used during flocculation ultimately result in clays of commerce containing residual acids. The paper treated with acidic kaolin clay deteriorates more rapidly than paper treated with a non-acidic clay. Therefore, a preferred clay for use in paper treatment would be non-acidic.

SUMMARY OF THE INVENTION

The present invention is a process for increasing the viscosity and reducing the filtration rate of a water and clay slurry, comprising admixing, at a pH greater than about 7.5, an additive selected from the group consisting essentially of (1) a non-flocculating polyalkylene polyamine having an average molecular weight of less than about 1000 and (2) a polyalkylene polyamine having an average molecular weight of less than about 1000 and a latex, with the water and clay slurry, said additives being used in an amount effective to increase the rate of filtration of liquids from the insoluble clay and increase the viscosity of the slurry as compared to a clay slurry containing only water and clay.

DETAILED DESCRIPTION OF ILLUSTRATIVE EMBODIMENTS

The filtration method of the present invention can be practiced by introduction of an additive consisting of a polyalkylene polyamine, or a latex and a polyalkylene polyamine, into the water and clay slurry. Introduction of the additive is made after the clay has been removed from the clay seam, but prior to filtering.

Polyalkylene polyamines are well-known compounds For the purposes of the present invention, it is preferred to employ a polyalkylene polyamine having an average molecular weight of less than about 1,000, more preferably less than about 800. Examples of polyalkylene polyamines include ethylenediamine, diethylenetriamine, triethylenetetramine, tetraethylenepentamine, pentaethylenehexamine, hexaethyleneheptamine, piperazine, aminoethylpiperazine, propylenediamine, butylenediamine, pentamethylenediamine, hexamethylenediamine, diethylenetriamine, dipropylenetriamine, dibutylenetriamine, bis(pentamethylene)triamine, bis(hexamethylene)triamine, tripropylenetetramine, tris(hexamethylene)tetramine, tetrapropylenepentamine, tetrabutylenepentamine, tetrakis(pentamethylene)pentamine, tetrakis(hexamethylene)pentamine, pentapropylenehexamine, pentabutylenehexamine, pentakis(pentamethylene)hexamine, pentakis(hexamethylene)hexamine, bis(aminopropyl)ethylenediamine, bis(aminopropyl)diethylenetriamine, tris(aminopropyl)ethylenediamine, Ethyleneamine E-100 and the like. Examples of preferred polyalkylene polyamines include ethylenediamine, diethylenetriamine, triethylenetetramine, tetraethylenepentamine, Ethyleneamine E-100, piperazine and mixtures thereof. The preferred polyalkylene polyamines generally have the formula:

wherein n can be from zero to about 6, m can be from 1 to about 6, and p can be from 1 to about 15, with the proviso that n and m can vary independently within a molecule from one repeating unit to the next. Preferably, n is zero, p is 1 and m is from about 3 to about 6.

Thus, preferred polyalkylene polyamines for use in the practice of this invention include ethylene polyamines. It is preferred that the ethylene polyamines used have an average molecular weight less than about 1000. It is more preferred that the ethylene polyamines used have an average molecular weight less than about 800. Higher weight polyalkylene polyamines flocculate the clay suspension. Examples of preferred polyalkylene polyamines include ethylenediamine, diethylenetriamine, triethylenetetramine, tetraethylenepentamine, piperazine, Ethyleneamine E-100, and mixtures thereof. Examples of more preferred polyalkylene polyamines include Ethyleneamine E-100, tetraethylenepentamine, and triethylenetetramine.

The polyalkylene polyamine additive of this invention includes individual polyalkylene polyamines and mixtures thereof. For example, some polyalkylene polyamines such as triethylenetetramine and tetraethylenepentamine (hereinafter TEPA) are generally available commercially only as a mixture of isomers having similar boiling points. Likewise, Ethyleneamine E-100 is a blend of isomers having similar boiling points around 240° to 260° C. at atmospheric pressure and average molecular weights of about 250 to about 300. Also suitable for use in the practice of this invention are mixtures of isomers having similar boiling points and higher molecular weights up to about 1000. In addition to the linear isomers of the polyalkylene polyamines, branched and cyclic isomers of these compounds may also be employed.

A latex is optionally employed in the process of the present invention in conjunction with the polyalkylene polyamine. Examples of preferred latexes include latexes such as styrene-butadiene latexes, acrylic latexes, ethylene-acrylic acid latexes, and other latexes known in the art. One such commercially available styrene-butadiene latex is SB Latex 233A produced by The Dow Chemical Company.

The ratio of polyalkylene polyamine to latex, when a latex is used, is any which will result in a slurry composition which exhibits a faster filtration rate compared with a slurry comprised solely of water and clay. A preferred weight ratio of polyalkylene polyamine to latex is at least about 5:95 and no greater than about 95:5. It is more preferred that the weight ratio is at least about 30:70 and no greater than about 70:30. It is most preferred that the weight ratio of polyalkylene polyamine to latex is about 50:50.

The polyalkylene polyamine and the latex, when used, may be added to the slurry composition separately. Alternatively, the polyalkylene polyamine and latex may be mixed together, optionally with water, and added to the slurry composition at once. When the polyalkylene polyamine and latex are mixed together before being added to the slurry composition, it is preferred to mix the two components by preparing an aqueous solution of the polyamine and an aqueous suspension of the latex, and adding the polyamine solution to the latex suspension with stirring. When mixed with water, the weight ratio of polyalkylene polyamine and latex to water is preferably about 1:1. However, other ratios may be used.

The additive consisting of the polyalkylene polyamine, or the polyalkylene polyamine and a latex, are employed in an amount which is effective to increase the filtration rate of the slurry relative to a slurry which is identical except for the presence of the additive. The additive is added to the slurry in an amount less than that which would irreversibly flocculate the clay slurry. Moreover, the additive is more preferably added to the slurry in an amount less than that which would flocculate the clay slurry, typically less than one percent by weight of slurry. Preferably, the additive may be added as a weight percentage between about 0.001 and about 1 percent. It is more preferred that the additive be added as a weight percentage between about 0.05 and about 0.15. The most preferred weight percentage of additive is about 0.10 percent.

The pH of the slurry in the process of this invention is above about 7.5. While pH of the slurry may be adjusted by the addition of various additives such as NaOH which are well known to those skilled in the art, it is preferred that the pH of at least about 7.5 result from the basicity of the polyalkylenepolyamine additives.

Clay slurries treated in accordance with the method of the current invention display an increase in viscosity.

Specific Embodiments of the Invention

The following examples are given to illustrate the invention and should not be construed as limiting its scope. All parts and percentages are by weight unless otherwise indicated.

Slurry Preparation Procedure

A 16-ounce polyethylene bottle containing 5 alumina balls is placed on a top-loading balance and tared. To this bottle is added a quantity of 50.0 percent additive solution corresponding to the concentrations of additive in the final slurry given in the Examples. Then kaolin clay slurry is added until the bottle contains a total of 500.0 grams of material (kaolin slurry plus additive solution). The bottle is capped and shaken vigorously by hand until the contents appear uniformly mixed. The bottle is then placed on its side in a mechanical shaker (side to side action) and allowed to shake for 30 minutes at high speed.

Filtration Properties Testing Procedure

A Baroid High Pressure Filter Press is used in the testing. This device applies nitrogen pressure to the top of a slurry column, which is resting on a filter disk Application of the pressure forces the filtrate through the filter, to be collected in a 5 ml graduated cylinder below. The clay powder forms a filter cake on the filter. When temperature and pressure are held constant, the time required for a certain quantity of filtrate to be collected is a good measure of ease of filtration. The cell body is filled with one half of the slurry prepared as above. A filter disk is placed over the O-ring in the cell body. Then the support screen is placed flush side down over the filter paper. Another O-ring is placed on the cell cap, and the cell cap fastened to the cell body. The cell body containing the slurry is inverted. The nitrogen pressure is regulated to the desired level (25 psig), and the line connected to the top of the cell body. Both upper and lower valve stems to the cell body are opened, and a graduated cylinder was placed under the lower, outlet stem. The nitrogen valve is opened and the timer started simultaneously. The time required for 1, 2, 3, and 5 ml of filtrate to be collected is noted. Following completion of the test, the cell is depressurized and cleaned. The test is repeated to give two replications per slurry. Test conditions and resulting data for the individual runs are given in the Examples A Baroid filter press is used to generate data for Examples. In order to simplify experimental arrangements, filtration is facilitated by applying pressure to the top of the suspension to be filtered, rather than by applying vacuum from below. However, the pressure differential across the filter should be the same. Positive results obtained with pressure filtration should apply equally well to vacuum filtration, rotary filtration and to ambient pressure, gravity filtration.

Two flocculated kaolin clay slurries are used in the Examples. Slurry A contains a kaolin clay composition having about 40 percent of the clay made up of particles 2 microns or less in size. Slurry B contains a kaolin clay composition having about 55 percent of the clay made up of particles 2 microns or less in size. Slurry A thus has a larger average particle size than the average particle size in Slurry B.

The additives are added to the slurry, followed by efficient mixing. The treated slurry is placed in the Baroid filter press and filtered through membrane filters of known porosity. Both 0.22 micron and 0.45 micron filters are employed in the Baroid filter press. The volume of filtrate produced as a function of filtration time is taken as a measure of filtration.

Selected filtration rate data for a series of polyalkylene polyamines and other additives is presented in Examples 1-4. The Example tables report the time (in seconds) required to obtain 3 or 5 ml of filtrate under a given set of conditions. Data for both filter sizes are given in the Examples. In all of the Examples, a control experiment designates a run wherein no additive is mixed in the slurry.

EXAMPLE 1

Time Required to Produce Indicated Volumes of Filtrate When Filtering Clay Slurry B Employing a Baroid High Pressure Filter Press (1000 ppm additive, 25 psi, 0.22 and 0.45 μm filters, time given in seconds).

TABLE I

|  | 0.22 μm Filter | | 0.45 μm Filter | |
|---|---|---|---|---|
|  | 3 ml | 5 ml | 3 ml | 5 ml |
| Control[1] | 21.5 | 47.5 | 13.0 | 34.0 |
| Ethylenediamine | 16.8 | 35.6 | 15.6 | 34.1 |
| Diethylenetriamine | 15.7 | 34.0 | 14.7 | 32.3 |
| Triethylenetetramine | 11.2 | 23.9 | 10.8 | 23.6 |
| Tetraethylenepentamine | 12.0 | 27.5 | 10.5 | 24.5 |
| Ethyleneamine E-100 | 9.5 | 20.1 | 9.0 | 19.6 |
| Piperazine | 13.3 | 28.1 | 11.7 | 26.3 |
| TEPA[2]/SB Latex 233A 50:50 wt/wt blend | 12.0 | 25.5 | 11.8 | 26.2 |
| SB Latex 233A[1] | 19.3 | 43.5 | 18.2 | 41.8 |

[1]Not an embodiment of the invention
[2]Tetraethylenepentamine

EXAMPLE 2

Time Required to Produce Indicated Volumes of Filtrate When Filtering Clay Slurry A Employing a Baroid High Pressure Filter Press (1000 ppm additive, 25 psi, 0.22 and 0.45 μm filters, time given in seconds).

TABLE II

|  | 0.22 μm Filter | | 0.45 μm Filter | |
|---|---|---|---|---|
|  | 3 ml | 5 ml | 3 ml | 5 ml |
| Control[1] | 10.4 | 25.9 | 8.9 | 21.4 |
| Ethylenediamine | 9.5 | 20.3 | 10.1 | 18.8 |
| Diethylenetriamine | 9.8 | 19.4 | 7.0 | 16.1 |
| Triethylenetetramine | 7.8 | 16.5 | 7.9 | 17.4 |
| Tetraethylenepentamine | 7.0 | 15.0 | 6.2 | 13.3 |
| Ethyleneamine E-100 | 5.7 | 13.6 | 5.7 | 12.7 |
| Piperazine | 9.0 | 19.3 | 7.4 | 16.9 |
| TEPA[2]/SB Latex 233A 50:50 wt/wt blend | 6.6 | 14.2 | 6.4 | 13.6 |
| SB Latex 233A[1] | 10.1 | 24.3 | 8.8 | 21.3 |

[1]Not an embodiment of the invention
[2]Tetraethylenepentamine

Example Tables I and II contain filtration rate results for a series of etyleneamines, a styrenebutadiene latex-tetraethylenepentamine (TEPA) blend, and the latex alone. In all cases, filtration rate enhancement is observed. This is true with both clay types and using either filter size. Reductions in filtration time of up to 58 percent were observed. Ethyleneamine E-100 appears to possess the greatest ability to facilitate filtration, although the other ethyleneamines and the amine-latex blend show significant activity.

EXAMPLE 3

Time Required to Produce Indicated Volumes of Filtrate When Filtering Clay Slurry B Employing a Baroid High Pressure Filter Press (25 psi, 0.22 and 0.45 μm filters, time given in seconds).

TABLE III

|  | Additive Level (ppm) | 0.22 μm Filter | | 0.45 μm Filter | |
|---|---|---|---|---|---|
|  |  | 3 ml | 5 ml | 3 ml | 5 ml |
| Control[1] | 0 | 21.5 | 47.5 | 13.0 | 34.0 |
| Ethyleneamine E-100 | 500 | 15.2 | 33.4 | 12.7 | 27.7 |
| Ethyleneamine E-100 | 1000 | 9.5 | 20.1 | 9.0 | 19.6 |
| Ethyleneamine E-100 | 1500 | 12.7 | 27.2 | 11.4 | 24.8 |
| TEPA[2]/SB Latex 233A 50:50 wt/wt blend | 500 | 14.1 | 31.9 | 14.6 | 32.2 |
| TEPA[2]/SB Latex 233A 50:50 wt/wt blend | 1000 | 12.0 | 25.5 | 11.8 | 26.2 |
| TEPA[2]/SB Latex 233A 50:50 wt/wt blend | 1500 | 13.8 | 30.2 | 14.0 | 30.7 |

[1]Not an embodiment of the invention
[2]Tetraethylenepentamine

EXAMPLE 4

Time Required to Produce Indicated Volumes of Filtrate When Filtering Clay Slurry A Employing a Baroid High Pressure Filter Press (25 psi, 0.22 and 0.45 μm filters, time given in seconds).

TABLE IV

|  | Additive Level (ppm) | 0.22 μm Filter | | 0.45 μm Filter | |
|---|---|---|---|---|---|
|  |  | 3 ml | 5 ml | 3 ml | 5 ml |
| Control[1] | 0 | 10.4 | 25.9 | 8.9 | 21.4 |
| Ethyleneamine E-100 | 500 | 6.3 | 13.2 | 5.4 | 12.3 |
| Ethyleneamine E-100 | 1000 | 5.7 | 13.6 | 5.7 | 12.7 |
| Ethyleneamine E-100 | 1500 | 8.7 | 17.3 | 5.5 | 12.0 |
| TEPA[2]/SB Latex 233A 50:50 wt/wt blend | 500 | 7.1 | 16.9 | 5.7 | 13.6 |
| TEPA[2]/SB Latex 233A 50:50 wt/wt blend | 1000 | 6.6 | 14.2 | 6.4 | 13.6 |
| TEPA[2]/SB Latex 233A 50:50 wt/wt blend | 1500 | 7.6 | 16.6 | 5.7 | 13.3 |

[1]Not an embodiment of the invention
[2]Tetraethylenepentamine

Examples Tables III and IV contain dose sensitivity data for Ethyleneamine E-100 and the latex-TEPA blend. In general, an additive level of 1000 ppm (based on the total weight of the slurry) was found to be best. However, results obtained with 500 and 1500 ppm were only slightly inferior.

Based upon these observations, it can be concluded that the addition of small amounts of ethyleneamines to kaolin clay slurries will facilitate the rate of filtering of these mixtures.

The Examples show that the inventive additives increase the rate of filtration on both of the clay slurries. Also, it can be seen that latex enhances the performance of the particular amine used in the Examples. Table I shows that TEPA's filtration rate equals 12.0 seconds using 1000 ppm additive and using a 0.22 μm filter under the 3 ml column. The same result is obtained when using a 50:50 TEPA-latex blend wherein the total amount of additive is 1000 ppm: therefore, only 500 ppm of TEPA in the presence of latex produces the same effect as the 1000 ppm of TEPA by itself. Yet latex as an additive in itself has little effect on the rate of filtration.

What is claimed is:

1. A process for increasing the viscosity and filtration rate of a water and clay slurry, comprising admixing, at a pH greater than about 7.5, an additive selected from the group consisting essentially of (1) a non-flocculating polyalkylene polyamine having an average molecular weight of less than about 1000 and (2) a non-flocculating polyalkylene polyamine having an average molecular weight of less than about 1000 and a latex, with the water and clay slurry, said additive being used in an amount effective to increase the rate of filtration of liquids from the insoluble clay and increase the viscosity of the slurry as compared to a clay slurry containing only water and clay.

2. The process of claim 1 wherein the additive consists essentially of the polyalkylene polyamine.

3. The process of claim 1 wherein the additive consists essentially of the polyalkylene polyamine and latex.

4. The process of claim 3 wherein the weight ratio of polyalkylene polyamine to latex ranges from about 10:90 to about 90:10.

5. The process of claim 3 wherein the weight ratio of polyalkylene polyamine to latex ranges from about 25:75 and about 75:25.

6. The process of claim 3 wherein the weight ratio of polyalkylene polyamine to latex is about 50:50.

7. The process of claim 1 wherein the slurry is filtered essentially in the absence of any added 8. The process of claim 3 wherein the latex and the polyalkylene polyamine are admixed before addition to the clay and water slurry.

9. The method of claim 1 wherein the weight percentage of the additive in the admixed slurry is between about 0.01 and about 1.0.

10. The process of claim 1 wherein the weight percentage of the additive in the admixed slurry is between about 0.05 and about 0.15.

11. The process of claim 1 wherein the weight percentage of the additive in the admixed slurry is about 0.1.

12. The process of claim 1 wherein the polyalkylene polyamine is selected from the group consisting of ethylenediamine, diethylenetriamine, triethylenetetramine, tetraethylenepentamine, piperazine and mixtures thereof.

13. The process of claim 1 wherein the polyalkylene polyamine is selected from the group consisting of triethylenetetramine, tetraethylenepentamine and mixtures thereof.

14. The process of claim 1 wherein the polyalkylene polyamine is tetraethylenepentamine.

15. The process of claim 1 wherein the polyalkylene polyamine is a mixture of polyalkylene polyamine isomers having average molecular weight of about 250 to about 300 and having a boiling point of about 240° C. to about 260° C. at atmospheric pressure.

16. The process of claim 3 wherein the latex is selected from a group consisting of styrene-butadiene latexes, acrylic latexes, ethylene-acrylic acid latexes and mixtures thereof.

17. The process of claim 16 wherein the latex is a styrene-butadiene latex.

18. The process of claim 1 wherein the additive consists essentially of about 0.1 weight percent, based on the weight of the slurry, of a styrene-butadiene latex and tetraethylenepentamine in a one to one weight ratio.

* * * * *

UNITED STATES PATENT AND TRADEMARK OFFICE
CERTIFICATE OF CORRECTION

PATENT NO. : 5,057,467
DATED : October 15, 1991
INVENTOR(S) : Alan P. Croft

It is certified that error appears in the above-identified patent and that said Letters Patent is hereby corrected as shown below:

Title page, <u>References Cited</u>, should correctly contain the additional reference --Derwent 85-218798/36 (GB 2154-224A)--.

Column 7, Claim 7, line 28 "added" should correctly read --added acid--.

Column 8, Claim 15, line 20 "weight" should correctly read --weights--.

Signed and Sealed this

Sixth Day of April, 1993

Attest:

STEPHEN G. KUNIN

Attesting Officer

Acting Commissioner of Patents and Trademarks